(12) United States Patent
Cram

(10) Patent No.: US 12,499,957 B2
(45) Date of Patent: Dec. 16, 2025

(54) THERMAL CONDUCTION BASED BATCH TESTING SYSTEM

(71) Applicant: Micron Technology, Inc., Boise, ID (US)

(72) Inventor: Daniel P. Cram, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 75 days.

(21) Appl. No.: 18/532,961

(22) Filed: Dec. 7, 2023

(65) Prior Publication Data
US 2024/0194281 A1 Jun. 13, 2024

Related U.S. Application Data

(60) Provisional application No. 63/432,318, filed on Dec. 13, 2022.

(51) Int. Cl.
*G11C 29/08* (2006.01)
*G01R 31/28* (2006.01)

(52) U.S. Cl.
CPC .......... *G11C 29/08* (2013.01); *G01R 31/2874* (2013.01)

(58) Field of Classification Search
None
See application file for complete search history.

(56) References Cited

U.S. PATENT DOCUMENTS

| 11,656,272 | B1 * | 5/2023 | Jones | G01R 31/2891 324/762.01 |
| 12,007,451 | B2 * | 6/2024 | Jovanovic | G01R 31/50 |
| 2002/0056057 | A1 * | 5/2002 | Co | G01R 31/01 714/42 |
| 2010/0141288 | A1 * | 6/2010 | Di Lello | G01R 31/2889 324/762.02 |

(Continued)

FOREIGN PATENT DOCUMENTS

| JP | 2015055511 A | * | 3/2015 |
| KR | 20120065790 A | * | 6/2012 |

(Continued)

OTHER PUBLICATIONS

"International Search Report and Written Opinion of the International Searching Authority," issued in connection with Int'l Appl. No. PCT/US2023/83726, dated Apr. 22, 2024 (10 pages).

*Primary Examiner* — Guerrier Merant
(74) *Attorney, Agent, or Firm* — Holland & Hart LLP

(57) ABSTRACT

Methods, systems, and devices for thermal conduction based batch testing system are described. A testing system may include a set of memory devices may arranged on a loading cartridge and placed within the testing system. The testing system may include one or more test boards located in parallel with the memory devices within the testing system. In some cases, the testing system may push the test boards toward the cartridge, causing the memory devices to thermally couple with a heater board. The testing system may include a fluid filled cooling plate thermally coupled with (Continued)

the heater board. In some examples, the testing system may generate a vacuum within a housing containing the test boards and cartridge, which may cause the outside atmosphere to apply a force on the test boards towards the heater board.

18 Claims, 5 Drawing Sheets

(56) References Cited

U.S. PATENT DOCUMENTS

2011/0095777 A1   4/2011   Komoto et al.
2012/0112777 A1   5/2012   Aizawa et al.
2022/0334169 A1   10/2022  Sakata et al.

FOREIGN PATENT DOCUMENTS

KR   10-2017-0056188 A     5/2017
KR   10-2020-0060092 A     5/2020
WO   WO-9820939 A2 *       5/1998   ............. A61B 17/17

* cited by examiner

THERMAL CONDUCTION BASED BATCH TESTING SYSTEM

CROSS REFERENCE

The present Application for Patent claims priority to U.S. Patent Application No. 63/432,318 by Cram, entitled "THERMAL CONDUCTION BASED BATCH TESTING SYSTEM," filed Dec. 13, 2022, which is assigned to the assignee hereof, and which is expressly incorporated by reference in its entirety herein.

TECHNICAL FIELD

The following relates to one or more systems for memory, including a system for thermal conduction based batch testing.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an extremal power source. Memory cells configured in a volatile configuration may lose stored states when disconnected from an external power source. Memory devices may undergo testing before deployment to assess functionality in a variety of conditions, such as high temperature environments, low temperature environments, or both. Various testing systems may be used, such as thermally controlled testing systems which simulate high or low temperature environments.

DETAILED DESCRIPTION

Some memory device s may undergo testing before deployment to assess functionality in a variety of conditions. For example, some memory devices may be deployed in high or low temperature environments, and so testing may be performed in an oven to determine functionality at high or low temperatures. In some cases, testing may occur in a convection oven, which may provide heated or cooled air over the memory devices during functional testing. However, such ovens may create a large temperature gradient, for example by providing the heating or cooling from the perimeter of the oven. That is, the temperature at the center of the convection oven may be substantially different from the temperature an edge of the oven. Convection ovens also may also heat a large volume of air in addition to the memory devices, which may reduce energy efficiency. Additionally, such ovens may include a testing interface with varied or relatively long distances to different tested memory devices, which may cause signal degradation between the testing interface and the memory devices.

As described herein, a testing system may use conduction-based thermal regulation to test memory devices at various temperatures. For example, a set of memory devices may be arranged on a loading tray or cartridge and placed within the testing system. The testing system may include one or more test boards located in parallel with (e.g., below) the memory devices within the testing system. In some cases, the testing system may push the test boards toward the cartridge, causing the memory devices to thermally couple with (e.g., contact) a heater board. To further control the temperature of the memory devices, the testing system may include a fluid filled cooling plate (e.g., a glycol fluid circulation system) thermally coupled with the heater board. In some examples, the movement of the test boards and cooling system may result from a pressure change. For example, the testing system may generate a vacuum within a housing containing the test boards and cartridge, which may cause the outside atmosphere to apply a force on the test boards towards the heater board. Accordingly, the test boards and the cartridge may move towards the heater board, which may cause the memory devices to contact the heater board. Such testing system may allow for more efficient energy use and more uniform temperature control in the testing of memory devices.

Features of the disclosure are initially described in the context of systems and heater boards as described with reference to FIGS. 1 through 4. These and other features of the disclosure are further illustrated by and described with reference to flowcharts that relate to thermal conduction based batch testing system as described with reference to FIG. 5.

Figure 1:
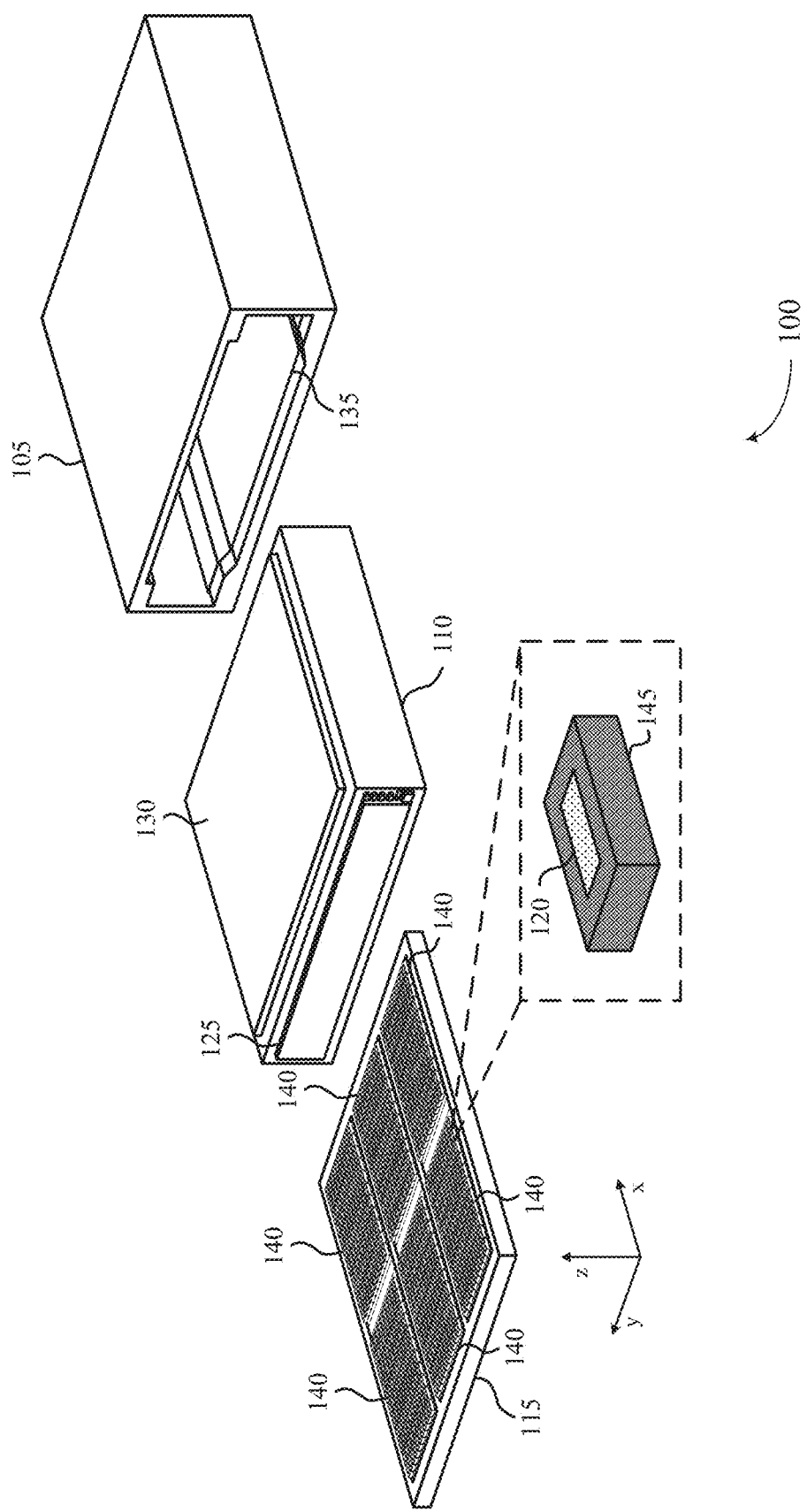
FIG. 1 illustrates an example of a system that supports thermal conduction based batch testing in accordance with examples as disclosed herein.

FIG. 1 illustrates an example of a testing system 100 that supports thermal conduction based batch testing in accordance with examples as disclosed herein. The testing system 100 may be configured to test a set of memory devices 120 in multiple thermal environments. The memory devices 120 may be examples of various types of packaged volatile or non-volatile memory, such as NAND devices, DRAM devices, RAM devices, ROM devices, SDRAM devices, SRAM devices, FeRAM devices, MRAM devices, RRAM devices, flash memory, PCM devices, self-selecting memory, chalcogenide memory technologies, or NOR devices. The testing system 100 may regulate the temperature of the set of memory devices 120 using a set of thermal plates, such as a heater board 130 and a cooling plate 135.

The testing system 100 may include one or more housings, such as an outer housing 105 and an inner housing 110, which may receive a cartridge 115 holding a plurality of memory devices 120. The cartridge 115 may include a printed circuit board (PCB), such as a burn-in board (BIB) configured to withstand various extreme temperatures, and may include a frame made of metal or other suitable material for rigidity and ease of handling. The cartridge 115 may include one or more sections 140, each section 140 having an array of sockets 145 to hold a memory device 120.

In some cases, a socket 145 may selectively couple an associated memory device 120 with an interface of the cartridge 115. For example, the socket 145 may include components such as springs which may isolate the memory device 120 from a channel of the interface when uncompressed, and may couple the memory device 120 with the channel when compressed (e.g., compressed in the z-direction). The interface may include channels configured to deliver power to the memory devices 120, as well as channels to communicate signaling, such as data channels to communicate data and command channels to communicate commands, with the memory devices 120. For example, the interface may support communicating functional testing signals from a test board with the memory devices 120.

The inner housing 110 may include a region 125 to receive and hold the cartridge 115 (e.g., the cartridge 115 may be inserted into the region 125). In some examples, the inner housing 110 may include one or more vertically stacked (e.g., in the z-direction) test boards (not shown), which may be arranged below the region 125. The one or more test boards may include testing equipment, such as tester electronics, drivers, power supplies, or a combination thereof, which may generate and communicate testing signals over testing channels between the testing equipment and the memory device 120 (e.g., via the cartridge 115). In some examples, the testing equipment may communicate signaling to the memory device 120 to access the memory cells of the memory device 120 (e.g., performing read and write operations). In some examples, the testing equipment may be an example of automated test equipment (ATE), and may include a power supply, a signal generator, a digital pattern generator, a pulse generator, a processor, a memory, a controller, or any combination thereof. The testing equipment may be an oscilloscope, frequency counter, or any other appropriate device which may analyze the response of the memory device 120 to the testing signals.

The inner housing 110 may include one or more heater boards 130 to heat the memory devices 120 during functional testing. In some cases, the inner housing 110 may be configured to allow selective coupling of the memory devices 120 with an upper heater board 130. For example, in response to a force applied on the test boards toward the upper heater board 130, the inner housing 110 may be configured to allow the test boards and cartridge 115 to move toward the upper heater board 130, and the memory devices 120 may come into contact with the upper heater board 130. In some examples, the inner housing 110 may include a lower heater board 130 (not shown) below the stack of test boards, which may allow for greater thermal control of the memory devices 120 and testing equipment.

The outer housing 105 may receive and hold the inner housing 110 (e.g., the inner housing 110 may be inserted into the outer housing 105). The outer housing 105 may include one or more cooling plates 135 to cool the memory devices 120 during functional testing. In some cases, the outer housing may include an upper cooling plate 135 and a lower cooling plate 135 (not shown). During functional testing, the outer housing 105 may selectively thermally couple the upper cooling plate 135 with the upper heater board 130, which may allow for both heating and cooling of the memory devices 120. In some examples, the lower heater board 130 may rest on (e.g., directly on) the lower cooling plate 135, which may allow for greater thermal control of the memory devices 120 and testing equipment. In some cases, the inner housing 110 may be configured to be removed from the outer housing 105, which may allow for maintenance, such as troubleshooting and repair, of the heater boards 130 and the test boards.

In some cases, a cooling plate 135 may be an example of a fluid-filled thermally conductive plate. For example, the cooling plate 135 may include an aluminum shell attached to a thermal regulation system, which may circulate a thermally controlled fluid, such as glycol, through the aluminum shell. Accordingly, the thermal regulation system may control the temperature of the cooling plate, for example by circulating cooled fluid within the cooling plate 135 to reduce the temperature of the cooling plate 135, or by stopping the circulation of the fluid, which may allow the heater board 130 to increase the temperature of the cooling plate 135.

The testing system 100 may generate a vacuum within the outer housing 105, the inner housing 110, or both. For example, the outer housing 105 may include or may be an example of a vacuum chamber configured to reduce air pressure (e.g., relative to atmospheric pressure) within the outer housing 105. In some examples, the outer housing 105 may include a pliable membrane, such as a gasket, connecting a first portion of the outer housing 105 with a second portion of the outer housing 105 which includes the lower cooling plate 135. Upon the vacuum chamber generating a vacuum, atmospheric pressure may apply a force directed upward (e.g., toward the upper heater board 130) on the second portion of the outer housing 105, which may in turn apply a force on the test board. The force may cause the test board to move towards and contact the cartridge, which may couple the memory devices 120 with the test board. The force may additionally move the cartridge towards and contact the upper heater board 130, and thus thermally couple the heater board 130 with the memory devices 120.

Although depicted as separate components, in some examples the inner housing 110 and the outer housing 105 may be integrated into a single housing which includes the test boards, the thermal plates, and the region 125 to receive the cartridge 115. Such a single housing may allow for simplified design and manufacture of the testing system 100, for example by reducing the quantity of independent parts used in the testing system 100.

The testing system 100 may allow for greater efficiency and flexibility for performing functional testing on the memory devices 120 compared with other systems, such as convection based oven systems. For example, because the testing system 100 may primarily use thermal conduction to regulate the temperature of the memory devices 120, the testing system 100 may not use energy to heat or cool a significant amount of air, which may increase energy efficiency. Additionally, because the thermal plates of the testing system 100 (e.g., the heater boards 130 and the cooling plates 135) may extend across the set of memory devices 120, the thermal plates may provide a lower temperature gradient across the set of memory devices (e.g., a more uniform temperature), which may increase yield by reducing thermal damage to the set of memory devices 120.

Figure 2:
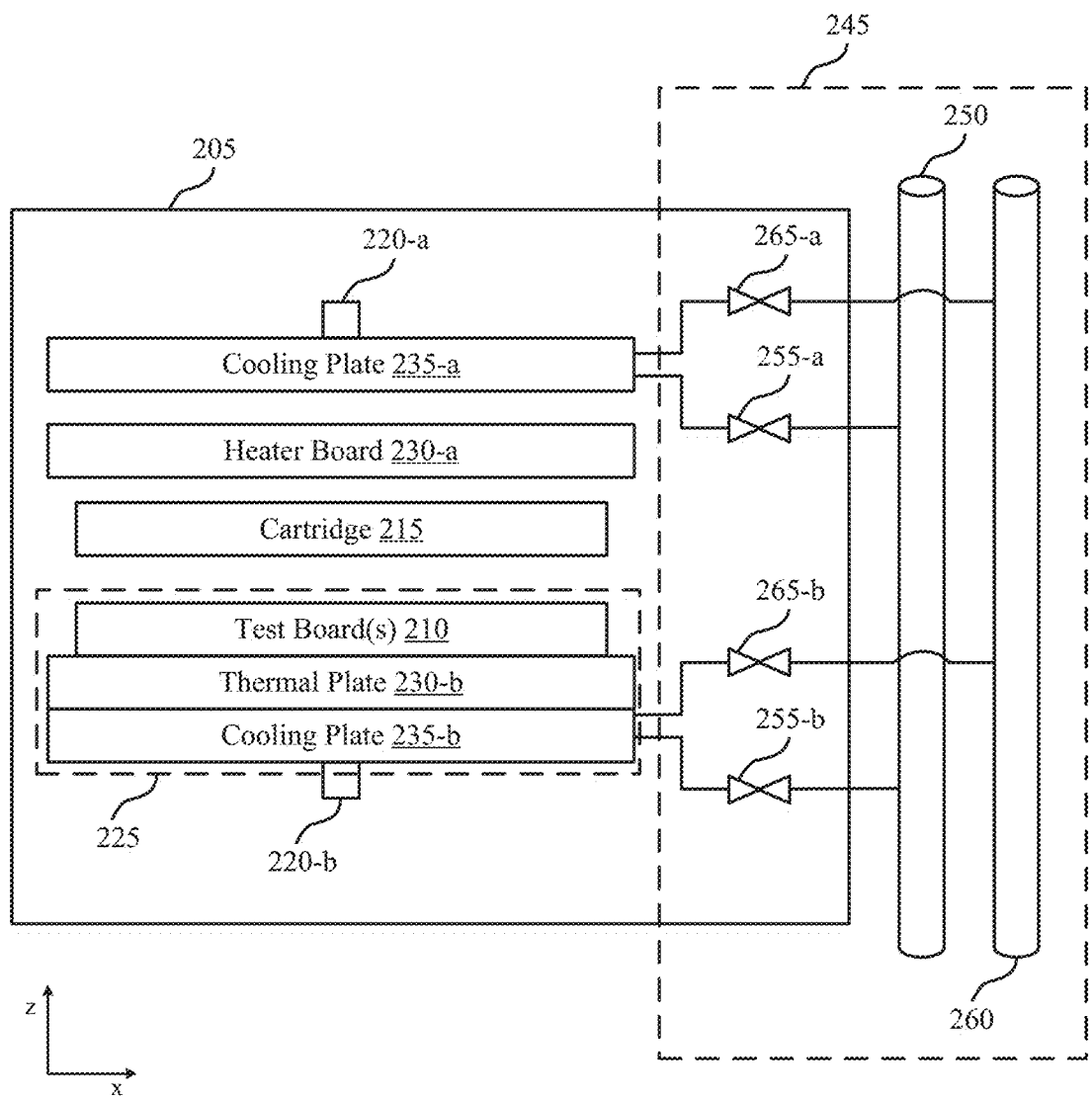
FIG. 2 illustrates an example of a system that supports thermal conduction based batch testing in accordance with examples as disclosed herein.

FIG. 2 illustrates an example of a testing system 200 that supports thermal conduction based batch testing in accordance with examples as disclosed herein. The testing system 200 may include aspects of the testing system 100. For example, the testing system 200 may include a housing 205, which may include aspects of the outer housing 105, the inner housing 110, or both. The testing system 200 may also include a set of thermal plates. For example, the testing system 200 may include a cooling plate 235-a, a cooling plate 235-b, a heater board 230-a, and a thermal plate 230-b, which may be examples of the corresponding entities as described with reference to FIG. 1, The testing system 200 may also include one or more test boards 210, which may be examples of the test boards as described with reference to FIG. 1.

The testing system 200 may include one or more pressure control components 220, such as a pressure control component 220-a (e.g., pressure valve) and a pressure control component 220-b (e.g., pressure valve), to manage air pressure within the housing 205 (e.g., to increase or decrease air pressure within the housing 205 relative to atmospheric pressure). For example, the pressure control components 220 may be configured to reduce pressure within the housing 205 (e.g., as part of generating a vacuum). Additionally, the pressure control components 220 may be configured to increase the pressure within the housing 205, for example by supplying clean dry air (CDA) to the housing 205. The pressure control components 220 may be coupled with a pressure system (not shown) that may provide for vacuum or CDA.

In some examples, the housing 205 may include a pliable membrane, such as a flexible seal or gasket, on the lower surface of the housing 205, which may be configured to contact and apply a force to an assembly 225, which may include the cooling plate 235-b, the thermal plate 230-b, the test boards 210, or a combination thereof, as described in greater detail with reference to FIG. 3.

Upon reducing the pressure within the housing 205, atmospheric pressure mar apply a force on the assembly 225 toward the cartridge 215 (e.g., in the z-direction). Accordingly, the test boards 210 may move toward the cartridge 215 to contact and electrically couple with the cartridge 215. The force may further move the assembly 225, as well as the cartridge 215, toward the heater board 230-a, such that memory devices held in the cartridge 215 contact the heater board 230-a. In some examples, the force may compress the memory devices against the heater board 230-a, and the cartridge 215 may be compressed to the test boards 210, which may electrically couple the memory devices with the test boards 210 (e.g., via the cartridge 215).

The testing system 200 may include a thermal regulation system 245 coupled with the cooling plate 235-a, the cooling plate 235-b, or both. The thermal regulation system 245 may manage the temperature of the cooling plates 235 by circulating a cooled fluid, such as glycol or other heat transfer fluid, through the cooling plates 235. For example, the thermal regulation system 245 may include a fluid exchange system, such as a fluid supply 250, which may provide the cooled fluid to the cooling plates 235, and a fluid return 260, which may receive the fluid from the cooling plates 235.

In some examples, the thermal regulation system 245 may include one or more valves, such as a supply valve 255-a and a supply valve 255-b, which may selectively allow the fluid to flow (e.g., by opening the supply valves 255) or block the fluid from flowing (e.g., by closing the supply valves 255) from the fluid supply 250 to the cooling plate 235-a and the cooling plate 235-b, respectively. Additionally, the thermal regulation system 245 may include a return valve 265-a and a return valve 265-b, which may selectively allow the fluid to flow (e.g., by opening the return valves 265) or block the fluid from flowing (e.g., by closing the return valves 265) to the fluid return 260 from the cooling plate 235-a and the cooling plate 235-b, respectively.

In some examples, the cooling plate 235-b and the thermal plate 230-b may be configured to maintain the temperature of the test boards 210 during testing. For example, the testing system 200 may include a controller to monitor the temperature of the test boards 210. Upon detecting a rise in the temperature (e.g., upon the temperature or the rate of increase thereof reaching a threshold), the controller may operate the supply valve 255-b and the return valve 265-b to cool the cooling plate 235-b, and thus cool the thermal plate 230-b and the test boards 210.

Figure 3:
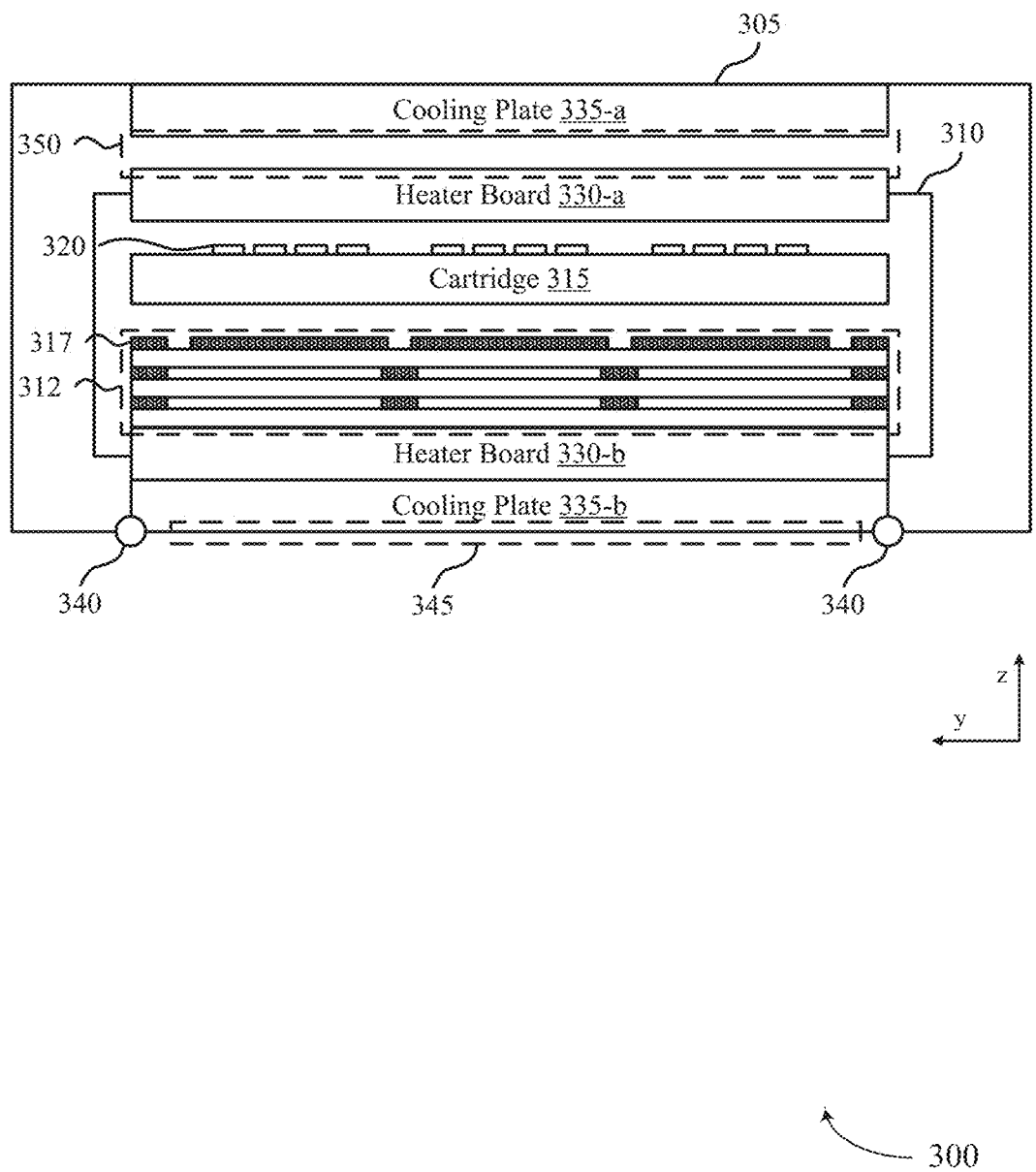
FIG. 3 illustrates an example of a system that supports thermal conduction based batch testing in accordance with examples as disclosed herein.

FIG. 3 illustrates an example of a testing system 300 that supports thermal conduction based batch testing in accordance with examples as disclosed herein. The testing system 300 may include aspects of the testing system 100, the testing system 200, or both. For example, the testing system 300 may include an outer housing 305, which may include aspects of the outer housing 105, the housing 205, or both, and an inner housing 310, which may include aspects of the inner housing 110, the housing 205, or both. The testing system 300 may also include a set of thermal plates. For example, the testing system 300 may include a cooling plate 335-a (e.g., a first thermal plate), a cooling plate 335-b (e.g., a fourth thermal plate), a heater board 330-a (e.g., a second thermal plate), and a heater plate 330-b (e.g., a third thermal plate), which may be examples of the corresponding entities as described with reference to FIGS. 1 and 2. The testing system 300 may also include one or more test boards 312, which may be an example of the corresponding entity as described with reference to FIGS. 1 and 2.

The testing system 300 may include one or more pressure control components, such as the pressure control component 220-a and 220-b as described with reference to FIG. 2, to manage air pressure within the outer housing 305, within the inner housing 310, or both. For example, the pressure control components may reduce the pressure within the inner housing 310 to move the cooling plate 335-b, the thermal plate 330-b, the test boards 312, and the cartridge 315 towards the heater board 330-a.

To support such a movement, the outer housing 305 may include a pliable membrane 340, such as a flexible seal or gasket, on the outer housing 305. The pliable membrane 340 may be located on the lower surface of the outer housing 305, and may allow a force to be applied on the lower cooling plate 335-b. For example, the pliable membrane 340 may separate the outer housing 305 into a first portion and a second portion 345. Upon reducing the pressure within the inner housing 310, atmospheric pressure may apply a force on the second portion 345 toward the cooling plate 335-b (e.g., upward, in the z-direction), which may cause the second portion 345 to contact and push the cooling plate 335-b upward. Accordingly, the cooling plate, thermal plate 330-b, and test boards 312 may move toward the cartridge 315, such that contacts 317 of the test boards 312 may connect and electrically couple with the cartridge 315. In some examples, the second portion 345 may include a plate of material which contacts and pushes on the cooling plate 335-b. Additionally or alternatively, the second portion 345 may be a portion of the lower surface of the cooling plate 335-b.

The force may further move the cartridge 315 toward the heater board 330-a, such that memory devices 320 held in the cartridge 315 contact the heater board 330-a. In some examples, the force may compress the memory devices against the heater board 330-a and the test boards 312 against the cartridge 315, which may electrically couple the memory devices with the test boards 312 (e.g., via the cartridge 315). In some examples, the heater board 330-a, the thermal plate 330-b, or both may include a thermal interface material. For example, the heater board 330-a may include a thermally conductive coating or plating on the surface thereof, which may contact the memory devices 320 to improve heat transfer between the memory devices 320 and the heater board 330-a. In some examples, the thermal interface material may be compliant (e.g., compressible), such that the thermal interface material conforms to the surface of the memory devices 320 upon contact.

In some examples the pressure control components may generate a low pressure environment (e.g., a vacuum) within a gap region 350 between the upper heater board 330-a and the upper cooling plate 335-a, relative to atmospheric pressure. Such a low-pressure environment within the gap region 350 may allow atmospheric pressure to apply a force on and move the heater board 330-a toward the cooling plate 335-a. Accordingly, the cooling plate 335-a may contact and thermally couple with the heater board 330-a. Additionally or alternatively, the pressure control components may increase the pressure, equalize the pressure, or both, within the inner housing 310. Accordingly, the pressure within the inner housing 310 may move the cooling plate 335-a away from the heater board 330-a and thus thermally isolate (e.g., thermally uncouple) the cooling plate 335-a from the heater board 330-a. In some examples, the process of thermally coupling and uncoupling the cooling plate 335-a with the heater board 330-a may be referred to as clutching and declutching, respectively.

In some examples, the cooling plate 335-a, the heater board 330-a, and the pressure control components may be configured to control the temperature of the memory devices 320 during testing. For example, the testing system 300 may include a controller to monitor the temperature of the memory devices 320. To perform testing in a high temperature environment, the controller may generate a current within heater circuits of the heater board 330-a to increase the temperature of the heater board 330-a, as described in greater detail with reference to FIG. 4. Additionally, the controller may activate the pressure control components to declutch the heater board 230-a from the cooling plate 235-a. Upon achieving the high temperature environment, the controller may initiate and perform functional testing on the memory devices 320, for example using the test boards 312.

To perform testing in a low temperature environment, the controller may operate the thermal regulation system (e.g., may operate the supply valve 255-a and the return valve 265-a) to cool the cooling plate 235-a. Additionally, the controller may activate the pressure control components to clutch the heater board 230-a to the cooling plate 235-a, and thus lower the temperature of the memory devices 320. Upon achieving the low temperature environment, the controller may initiate and perform functional testing on the memory devices 320, for example using the test boards 312.

Figure 4:
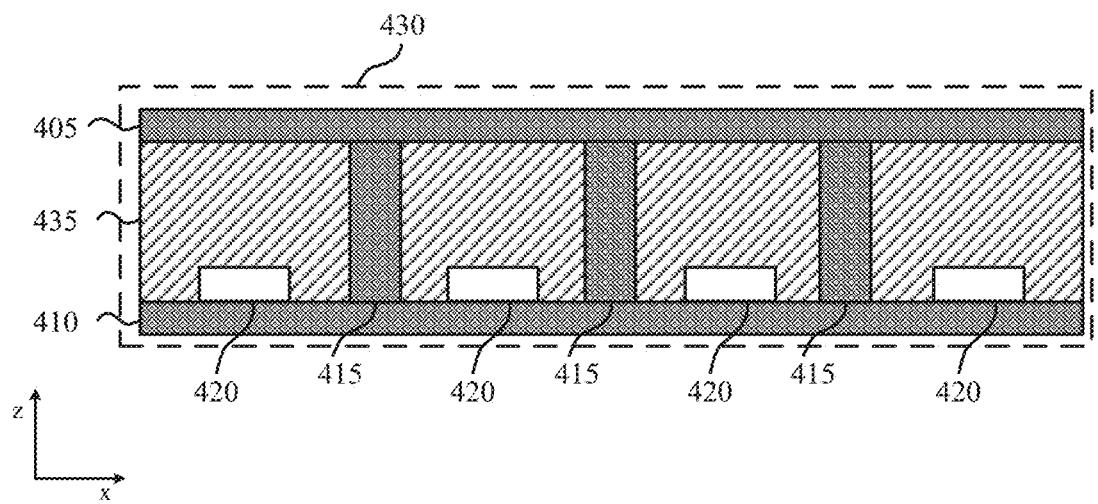
FIG. 4 illustrates an example of a thermal plate that supports thermal conduction based batch testing in accordance with examples as disclosed herein.

FIG. 4 illustrates an example of a heater board system 400 that supports thermal conduction based batch testing system in accordance with examples as disclosed herein. The heater board system 400 may illustrate an enlarged view of a heater board 430, which may be an example of the heater boards as described with reference to FIGS. 1 through 3. The heater board 430 may be an example of a thermal plate, and may heat a set of memory devices 120 during functional testing. The heater board 430 may include an upper contact plate 405, a lower contact plate 410, one or more thermal pathways 415, and one or more heater circuits 420.

The upper contact plate 405 may be an example of a thermally conductive plate (e.g., a copper plate), and may be arranged on the upper surface of the heater board 430. In some examples, the upper contact plate 405 may be coated with a protective material (e.g., a noble metal, such as silver), and may be configured to contact a cooling plate (e.g., a cooling plate 335-a) as part of a clutching process to cool the heater board system 400. Such contact with the cooling plate may support extracting energy from the heater board 430 during functional testing of the set of memory devices. In some examples, a thermal interface material may coat the upper surface of the upper contact plate 405. The lower contact plate 410 may be an example of a thermally conductive plate (e.g., a copper plate), and may form the lower surface of the heater board 430. The lower surface of the contact plate 410 may include a thermal interface material that may contact the set of memory devices. In some examples, the heater board 130 may include a thermally insulating material 435 between the upper contact plate 405 and the lower contact plate 410, such as an air gap or a fiberglass core.

The heater board 430 may include one or more heater circuits 420 arranged to uniformly heat the set of memory devices. For example, the heater circuits 420 may be arranged in accordance with the sections 140 to generate a substantially uniform temperature across each section 140. In some cases, the heater circuits 420 may be examples of resistive circuits, such as copper etchings on the lower surface of the heater board 430, and may be in contact with the lower contact plate 410. Accordingly, the lower contact plate 410 may be referred to as a heater plate. The heater board system 400 may be coupled with a controller, which may be configured to generate a current withing the heater circuits 420 to heat the heater board 430.

The heater board system 400 may include one or more thermal pathways 415, which may be examples of thermal vias, such as copper columns or strips connecting the upper contact plate 405 and the lower contact plate 410. The thermal pathways 415 may facilitate thermal regulation during functional testing by allowing for faster heat transfer from the heater board 430 to the cooling plate. For example, if the temperature of the set memory devices rises above a threshold, the heater board 430 may clutch to the cooling plate, and the thermal pathways 415 may increase the rate at which thermal energy flows from the set of memory devices to the cooling plate. In some examples, the material, dimensions, and quantity of the thermal pathways 415 may be selected to obtain an appropriate thermal conductivity to allow thermal energy to transfer away from the heater board 430 during cooling and also allow a sufficiently large temperature differential to develop between the heater board 430 and the cooling plate during heating. For example, the thermal pathways may give the heater board system 400 a thermal conductivity in the range of 0.5 to 2.0 watts per meter-kelvin (W/(m·K)).

Figure 5:
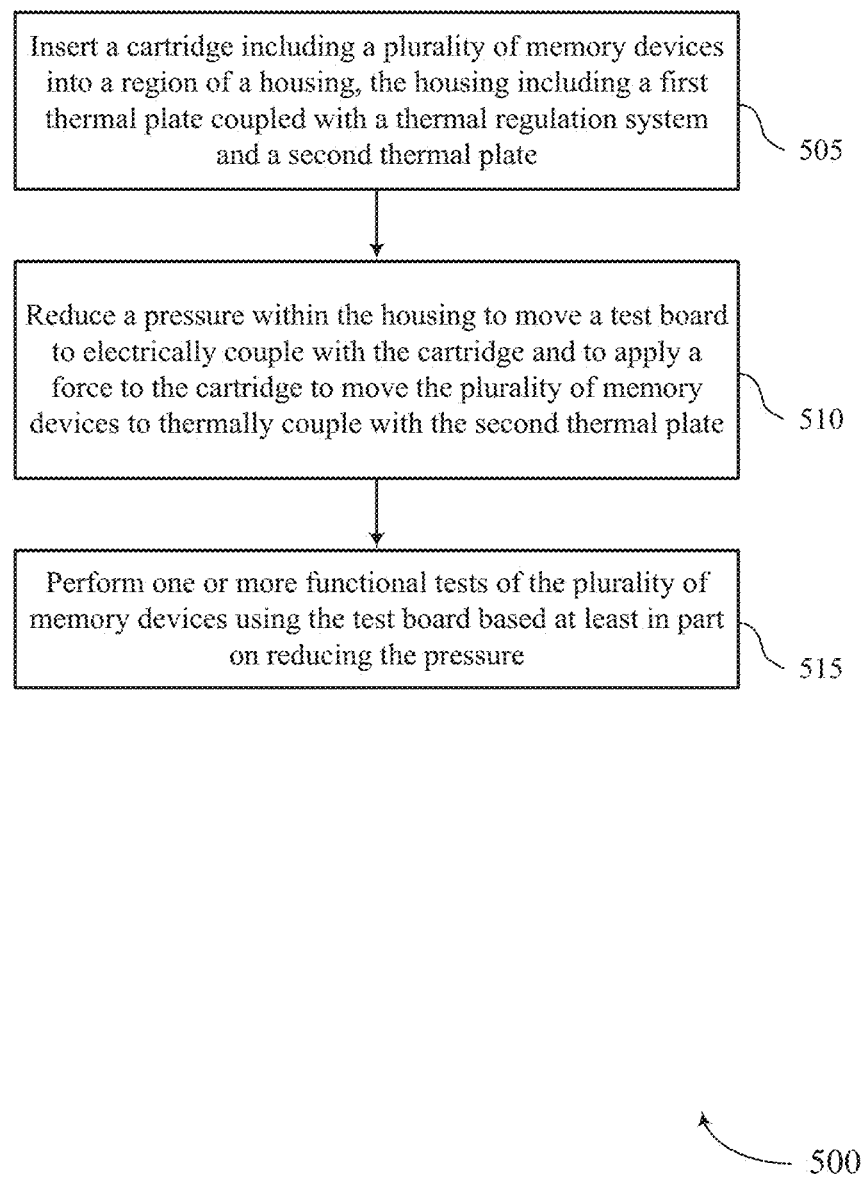
FIG. 5 illustrates a flowchart showing a method or methods that support thermal conduction based batch testing in accordance with examples as disclosed herein.

FIG. 5 illustrates a flowchart showing a method 500 that supports thermal conduction based batch testing system in accordance with examples as disclosed herein. The operations of method 500 may be implemented by a testing system or its components as described herein. In some examples, a testing system may execute a set of instructions to control the functional elements of the device to perform the described functions. Additionally, or alternatively, the testing system may perform aspects of the described functions using special-purpose hardware.

At 505, the method may include inserting a cartridge including a plurality of memory devices into a region of a housing, the housing including a first thermal plate coupled with a thermal regulation system and a second thermal plate. The operations of 505 may be performed in accordance with examples as disclosed herein.

At 510, the method may include reducing a pressure within the housing to move a test board to electrically couple with the cartridge and to apply a force to the cartridge to move the plurality of memory devices to thermally couple with the second thermal plate. The operations of 510 may be performed in accordance with examples as disclosed herein.

At 515, the method may include performing one or more functional tests of the plurality of memory devices using the test board based at least in pail on reducing the pressure. The operations of 515 may be performed in accordance with examples as disclosed herein.

In some examples, an apparatus as described herein may perform a method or methods, such as the method 500. The apparatus may include features, circuitry, logic, means, or instructions (e.g., anon-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for inserting a cartridge including a plurality of memory devices into a region of a housing, the housing including a first thermal plate coupled with a thermal regulation system and a second thermal plate; reducing a pressure within the housing to move a test board to electrically couple with the cartridge and to apply a force to the cartridge to move the plurality of memory devices to thermally couple with the second thermal plate: and performing one or more functional tests of the plurality of memory devices using the test board based at least in part on reducing the pressure.

Aspect 2: The method, apparatus, or non-transitory computer-readable medium of aspect 1, further including operations, features, circuitry, logic, means, or instructions, or any combination thereof for generating a current within one or more heater circuits of the second thermal plate, where generating the current and performing the one or more functional tests at least partially overlap in time.

Aspect 3: The method, apparatus, or non-transitory computer-readable medium of any of aspects 1 through 2, further including operations, features, circuitry, logic, means, or instructions, or any combination thereof for controlling a temperature of a fluid using the thermal regulation system and circulating the fluid within the first thermal plate, where circulating the fluid and performing the one or more functional tests at least partially overlap in time.

Aspect 4: The method, apparatus, or non-transitory computer-readable medium of aspect 3, further including operations, features, circuitry, logic, means, or instructions, or any combination thereof for reducing a second pressure within a gap region between the first thermal plate and the second thermal plate, where reducing the second pressure moves the second thermal plate towards the first thermal plate, such that the first thermal plate contacts the second thermal plate.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 5: An apparatus, including: a housing including: a first thermal plate coupled with a thermal regulation system; a second thermal plate; and a test board, where the housing is configured to: receive a cartridge selectively coupled with a plurality of memory devices in a region between the second thermal plate and the test board; and apply a force on the test board toward the second thermal plate, where the test board is configured to electrically couple with the cartridge in response to the force.

Aspect 6: The apparatus of aspect 5, where the housing further includes: a third thermal plate disposed below and thermally coupled with the test board.

Aspect 7: The apparatus of aspect 6, where the housing further includes: a pliable membrane between a first portion of the housing and a second portion of the housing, the pliable membrane configured to allow the second portion of the housing to move along a dimension orthogonal to the second thermal plate, where movement of the second portion of the housing applies the force on the test board.

Aspect 8: The apparatus of any of aspects 5 through 7, further including: a thermal interface material disposed on a lower surface of the second thermal plate, where the thermal interface material is configured to contact the plurality of memory devices.

Aspect 9: The apparatus of any of aspects 5 through 8, where: the second thermal plate includes one or more heater circuits: and the first thermal plate includes a fluid pathway and the thermal regulation system includes a fluid thermal exchange system.

Aspect 10: The apparatus of aspect 9, where the housing includes: an outer housing including the first thermal plate; and an inner housing including the second thermal plate and the test board, where the outer housing is configured to receive the inner housing.

An apparatus is described. The following provides an overview of aspects of the apparatus as described herein:

Aspect 11: An apparatus, including: a housing including: a first thermal plate coupled with a thermal regulation system; a second thermal plate; and a test board, where the housing is configured to: receive a cartridge selectively coupled with a plurality of devices within a region disposed between the second thermal plate and the test board; and move the test board to be electrically coupled with the cartridge and the plurality of memory devices to be thermally coupled with the second thermal plate.

Aspect 12: The apparatus of aspect 11, where the housing further includes: a third thermal plate disposed below and thermally coupled with the test board.

Aspect 13: The apparatus of aspect 12, further including: a pliable membrane between a first portion of the housing and a second portion of the housing, the pliable membrane configured to allow the second portion of the housing to move along a dimension orthogonal to the second thermal plate.

Aspect 14: The apparatus of any of aspects 11 through 13, further including: a thermal interface material disposed on a lower surface of the second thermal plate, where the thermal interface material is configured to contact the plurality of memory devices.

Aspect 15: The apparatus of any of aspects 11 through 14, where: the second thermal plate includes a heater plate disposed on a lower surface of the second thermal plate and including one or more heater circuits: and the first thermal plate includes a pathway for a fluid and the thermal regulation system includes a fluid thermal exchange system.

Aspect 16: The apparatus of aspect 15, where the second thermal plate further includes: a contact plate disposed on an upper surface of the second thermal plate; and a thermal pathway between the contact plate and the heater plate.

Aspect 17: The apparatus of any of aspects 15 through 16, where the fluid thermal exchange system includes: a set of valves, the set of valves configured to selectively supply the fluid to the first thermal plate based at least in part on a temperature of the first thermal plate.

Aspect 18: The apparatus of any of aspects 15 through 17, where the housing includes: an outer housing including the first thermal plate; and an inner housing including the second thermal plate and the test board, where the outer housing is configured to receive the inner housing.

Aspect 19: The apparatus of any of aspects 11 through 18, where the cartridge includes a plurality of sections, each section configured to hold a respective subset of the plurality of memory devices and each section includes a respective set of contacts configured to electrically couple the respective subset of the plurality of memory devices with the test board.

Aspect 20: The apparatus of aspect 19, where each section of the plurality of sections further includes a plurality of sockets configured to selectively couple the respective subset of the plurality of memory devices with the test board based at least in part on reducing the pressure within the housing.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal: however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The terms "layer" and "level" used herein refer to an organization (e.g., a stratum, a sheet) of a geometrical structure (e.g., relative to a substrate). Each layer or level may have three dimensions (e.g., height, width, and depth) and may cover at least a portion of a surface. For example, a layer or level may be a three dimensional structure where two dimensions are greater than a third, e.g., a thin-film. Layers or levels may include different elements, components, or materials. In some examples, one layer or level may be composed of two or more sublayers or sublevels.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority Carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B. or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAI, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure, Thus, the disclosure is not limited to the examples and designs described herein, but is to be accorded the broadest scope consistent with the principles and novel features disclosed herein.

What is claimed is:

1. An apparatus, comprising:
    a housing comprising:
        a first thermal plate coupled with a thermal regulation system;
        a second thermal plate;
        a test board; and
        a pliable membrane between a first portion of the housing and a second portion of the housing, the pliable membrane configured to allow the second portion of the housing to move along a dimension orthogonal to the second thermal plate, wherein the housing is configured to:
        receive a cartridge selectively coupled with a plurality of memory devices in a region between the second thermal plate and the test board; and
        apply a force on the test board toward the second thermal plate, wherein the test board is configured to electrically couple with the cartridge in response to the force, wherein the movement of the second portion of the housing applies the force on the plurality of memory devices against the second thermal plate and the test board against the cartridge.

2. The apparatus of claim 1, wherein the housing further comprises:
    a third thermal plate disposed below and thermally coupled with the test board.

3. The apparatus of claim 1, further comprising:
a thermal interface material disposed on a lower surface of the second thermal plate, wherein the thermal interface material is configured to contact the plurality of memory devices.

4. The apparatus of claim 1, wherein:
the second thermal plate comprises one or more heater circuits; and
the first thermal plate comprises a fluid pathway and the thermal regulation system comprises a fluid thermal exchange system.

5. The apparatus of claim 4, wherein the housing comprises:
an outer housing comprising the first thermal plate; and
an inner housing comprising the second thermal plate and the test board,
wherein the outer housing is configured to receive the inner housing.

6. An apparatus, comprising:
a housing comprising:
a first thermal plate coupled with a thermal regulation system;
a second thermal plate;
a test board; and
a pliable membrane between a first portion of the housing and a second portion of the housing, the pliable membrane configured to allow the second portion of the housing to move along a dimension orthogonal to the second thermal plate, wherein the housing is configured to:
receive a cartridge selectively coupled with a plurality of memory devices within a region disposed between the second thermal plate and the test board; and
move the test board to be electrically coupled with the cartridge and the plurality of memory devices to be thermally coupled with the second thermal plate, wherein the movement of the second portion of the housing applies a force on the plurality of memory devices against the second thermal plate and the test board against the cartridge.

7. The apparatus of claim 6, wherein the housing further comprises:
a third thermal plate disposed below and thermally coupled with the test board.

8. The apparatus of claim 6, further comprising:
a thermal interface material disposed on a lower surface of the second thermal plate, wherein the thermal interface material is configured to contact the plurality of memory devices.

9. The apparatus of claim 6, wherein:
the second thermal plate comprises a heater plate disposed on a lower surface of the second thermal plate and comprising one or more heater circuits; and
the first thermal plate comprises a pathway for a fluid and the thermal regulation system comprises a fluid thermal exchange system.

10. The apparatus of claim 9, wherein the second thermal plate further comprises:
a contact plate disposed on an upper surface of the second thermal plate; and
a thermal pathway between the contact plate and the heater plate.

11. The apparatus of claim 9, wherein the fluid thermal exchange system comprises:
a set of valves, the set of valves configured to selectively supply the fluid to the first thermal plate based at least in part on a temperature of the first thermal plate.

12. The apparatus of claim 9, wherein the housing comprises:
an outer housing comprising the first thermal plate; and
an inner housing comprising the second thermal plate and the test board, wherein the outer housing is configured to receive the inner housing.

13. The apparatus of claim 6, wherein the cartridge comprises a plurality of sections, each section configured to hold a respective subset of the plurality of memory devices, and each section comprises a respective set of contacts configured to electrically couple the respective subset of the plurality of memory devices with the test board.

14. The apparatus of claim 13, wherein each section of the plurality of sections further comprises a plurality of sockets configured to selectively couple the respective subset of the plurality of memory devices with the test board based at least in part on reducing a pressure within the housing.

15. A method, comprising:
inserting a cartridge comprising a plurality of memory devices into a region of a housing, the housing comprising a first thermal plate coupled with a thermal regulation system, a second thermal plate, and a pliable membrane between a first portion of the housing and a second portion of the housing, the pliable membrane configured to allow the second portion of the housing to move along a dimension orthogonal to the second thermal plate;
reducing a pressure within the housing to move a test board to electrically couple with the cartridge and to apply a force to the cartridge to move the plurality of memory devices to thermally couple with the second thermal plate, wherein the movement of the second portion of the housing applies the force on the plurality of memory devices against the second thermal plate and the test board against the cartridge; and
performing one or more functional tests of the plurality of memory devices using the test board based at least in part on reducing the pressure.

16. The method of claim 15, further comprising:
generating a current within one or more heater circuits of the second thermal plate, wherein generating the current and performing the one or more functional tests at least partially overlap in time.

17. The method of claim 15, further comprising:
controlling a temperature of a fluid using the thermal regulation system; and
circulating the fluid within the first thermal plate, wherein circulating the fluid and performing the one or more functional tests at least partially overlap in time.

18. The method of claim 17, further comprising:
reducing a second pressure within a gap region between the first thermal plate and the second thermal plate, wherein reducing the second pressure moves the second thermal plate towards the first thermal plate, such that the first thermal plate contacts the second thermal plate.

* * * * *